(12) United States Patent
Li

(10) Patent No.: US 7,369,330 B2
(45) Date of Patent: May 6, 2008

(54) IMAGE-FORMING LENS SET

(75) Inventor: Hung-Chih Li, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 11/402,954

(22) Filed: Apr. 13, 2006

(65) Prior Publication Data

US 2007/0146902 A1  Jun. 28, 2007

(51) Int. Cl.
*G02B 9/14* (2006.01)
(52) U.S. Cl. ...................................... 359/785; 359/784
(58) Field of Classification Search ................ 359/785, 359/784, 786, 787, 788, 773, 774, 690, 689
See application file for complete search history.

(56) References Cited

U.S. PATENT DOCUMENTS

| | | | | |
|---|---|---|---|---|
| 5,071,235 A * | 12/1991 | Mori et al. | ................. | 359/692 |
| 5,654,826 A * | 8/1997 | Suzuki | ....................... | 359/557 |
| 6,141,084 A * | 10/2000 | Kitahara | ...................... | 355/67 |
| 6,259,508 B1* | 7/2001 | Shigematsu | .................. | 355/53 |
| 6,532,342 B2* | 3/2003 | Yoneyama | .................... | 396/79 |

* cited by examiner

*Primary Examiner*—Timothy Thompson
(74) *Attorney, Agent, or Firm*—Browdy and Neimark, P.L.L.C.

(57) ABSTRACT

An image-forming lens set includes a first lens, a second lens, an aperture and a third lens arranged orderly from an objective side toward an image side in sequence. The first lens is made of plastic material and has a positive diopter and two opposite surfaces including a convex surface facing the image side. The second lens is made of plastic material and has a negative diopter and two opposite surfaces including a concave surface facing the image side. The third plastic lens is made of plastic material and has a positive diopter and two opposite surfaces including a convex surface facing the image side.

3 Claims, 1 Drawing Sheet

IMAGE-FORMING LENS SET

BACKGROUND OF THE INVENTION

1. Field of the Invention

The present invention relates image-forming lenses and more particularly, to an inexpensive image-forming lens set.

2. Description of the Related Art

Following fast development of multimedia technology, image-forming lenses have been intensively sued in a variety of mobile electronic products such as digital camera, mobile camera telephone, and etc., for picking up images. The cameras of these mobile electronic products commonly use a CCD (charge-coupled device) or a CMOS (complementary metal oxide semiconductor) to obtain the image of the objective for storage or transmission to a remote side through a personal computer or cellular telephone.

Following the heavy demand for high-tech products, the quality requirement becomes more critical. Further, in order to survive in the market and to attract consumers to buy, it is quite important to reduce the size of high-tech products for mobility and to lower their cost while maintaining the product quality. The fabrication of image-forming lens sets encounters the same market challenge.

SUMMARY OF THE INVENTION

The present invention has been accomplished under the circumstances in view. It is one object of the present invention to provide an image-forming lens set that is easy and inexpensive to manufacture and that provides a high image quality.

To achieve this object of the present invention, the image-forming lens set comprises a first lens, a second lens, an aperture and a third lens arranged orderly from an objective side toward an image side in sequence. The first lens is made of plastic material and has a positive diopter and two opposite surfaces including a convex surface facing the image side. The second lens is made of plastic material and has a negative diopter and two opposite surfaces including a concave surface facing the image side. The third plastic lens is made of plastic material and has a positive diopter and two opposite surfaces including a convex surface facing the image side.

DETAILED DESCRIPTION OF THE INVENTION

Figure 1:
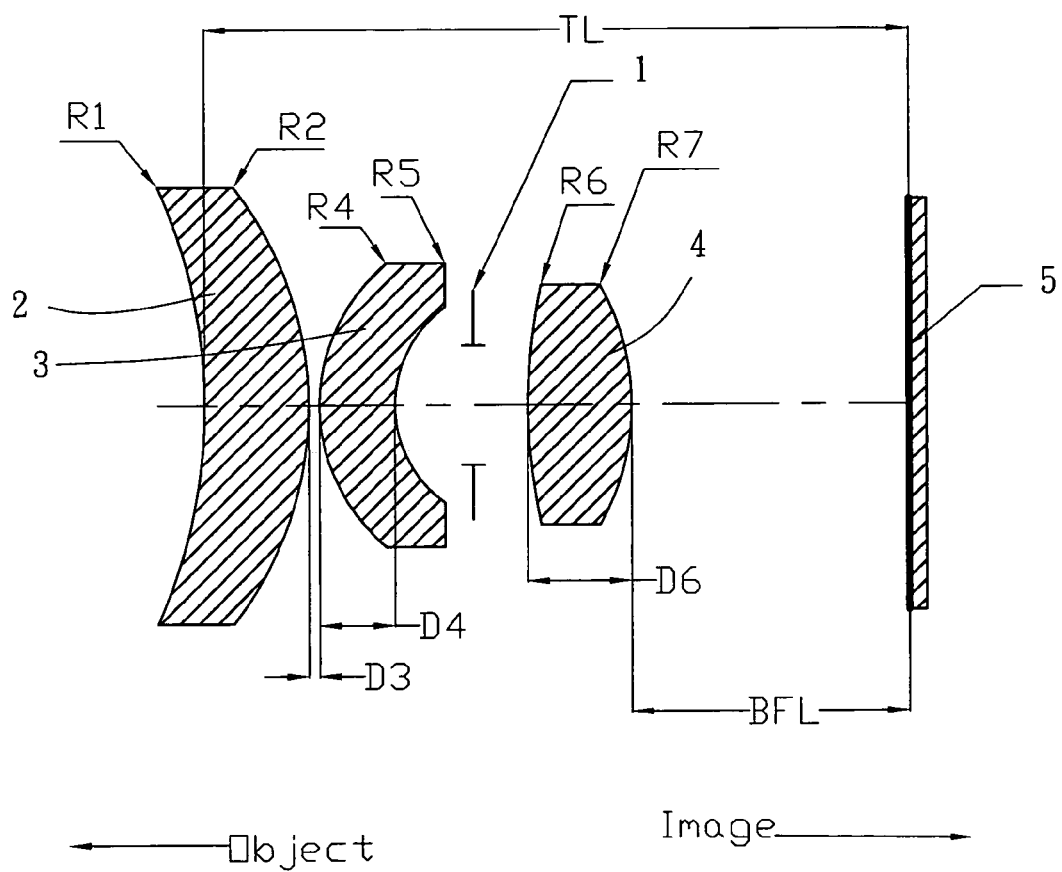
FIG. 1 is a schematic drawing showing the structure of an image-forming lens set according to a preferred embodiment of the present invention.

As shown in FIG. 1, an image-forming lens set in accordance with the preferred embodiment of the present invention comprises an aperture 1, a first lens 2, a second lens 3, and a third lens 4. The component parts are arranged from the objective side to the image side in the order of: the first lens 2, the second lens 3, the aperture 1, and the third lens 4. The first lens 2 is molded from resin (plastic material) and has two opposite surfaces made non-spherical and respectively facing the objective side and the image side. The surface of the first lens 2 that faces the objective side is a concave surface. The surface of the first lens 2 that faces the image side is a convex surface having a positive diopter. The second lens 3 is molded from resin (plastic material) and has two opposite surfaces made non-spherical and respectively facing the objective side and the image side. The surface of the second lens 3 that faces the objective side is a convex surface. The surface of the second lens 3 that faces the image side is a concave surface having a negative diopter. The third lens 4 is molded from resin (plastic material) and has two opposite surfaces made non-spherical and respectively facing the objective side and the image side. The surface of the third lens 4 that faces the objective side is a convex surface. The surface of the third lens 4 that faces the image side is a convex surface having a positive diopter. The aperture 1 is set between the second lens 3 and the third lens 4.

The aforesaid image-forming lens set satisfies the following conditions.

$$TL/f > 1.5 \tag{a}$$

in which:

TL: the distance between the peak of the concave surface of the first lens 2 that faces the objective side and an image-forming surface 5 at the image side;

f: the value of the equivalent focal length of the image-forming lens set.

$$BFL/f > 0.5 \tag{b}$$

in which:

BFL: the value of back focal length of the image-forming lens set.

$$1 < |R4|/|R5| < 5 \tag{c}$$

in which:

|R4|: the absolute value of the radius of curvature of the convex surface of the second lens 3 that faces the objective side;

|R5|: the absolute value of the radius of curvature of the non-spherical surface of the second lens 3 that faces the image side; wherein the unit of radius of curvature is millimeter.

$$0.1 < |R6|/|R7| < 10 \tag{d}$$

in which:

|R6|: the absolute value of the radius of curvature of the convex surface of the third lens 4 that faces the objective side;

|R7|: the absolute value of the radius of curvature of the non-spherical surface of the third lens 4 that faces the image side; wherein the unit of radius of curvature is millimeter.

$$D3/f < 0.5 \tag{e}$$

in which

D3: the distance between the peak (optical axis) of the non-spherical surface of the first lens 2 that faces the image side and the peak (optical axis) of the convex surface of the second lens 3 that faces the objective side.

$$0.2 < D4/D6 < 3 \tag{f}$$

in which:

D4: the distance between the center (optical axis) of the convex surface of the second lens 3 that faces the objective side and the center (optical axis) of the non-spherical surface of the second lens 3 that faces the image side.

D6: the distance between the center (optical axis) of the convex surface of the third lens 4 that faces the objective side and the center (optical axis) of the non-spherical surface of the third lens 4 that faces the image side.

$$1 < |R1|/|R2| < 5 \tag{g}$$

in which:

|R1|: the absolute value of the radius of curvature of the concave surface of the first lens 2 that faces the objective side;

|R2|: the absolute value of the radius of curvature of the non-spherical surface of the first lens 2 that faces the image side; wherein the unit of radius of curvature is millimeter.

According to the aforesaid design, the first, second and third lenses are respectively made of a resin for the advantage of low manufacturing cost. Because the hole of the aperture is on the middle, the acceptable tolerance is relatively greater to facilitate the fabrication. The use of non-spherical lenses provides a relatively higher resolution and a relatively smaller chief ray angle, a relatively less number of lenses to be needed for forming image, as well as a relatively longer BFL (back focal length).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An image-forming lens set consisting only of a first lens, a second lens, an aperture and a third lens arranged in the order recited from an objective side toward an image side in sequence;

wherein the first lens is made of plastic material and has a positive diopter and two opposite surfaces including a convex surface facing the image side;

wherein the second lens is made of plastic material and has a negative diopter and two opposite surfaces including a concave surface facing the image side;

wherein the third plastic lens is made of plastic material and has a positive diopter and two opposite surfaces including a convex surface facing the image side;

wherein the first lens has a concave surface facing the objective side;

wherein at least one of the two opposite surfaces of the first lens is a non-spherical surface;

wherein at least one of the two opposite surfaces of the second lens is a non-spherical surface;

wherein at least one of the two opposite surfaces of the third lens is a non-spherical surface;

wherein said lens set satisfies the condition of TL/f<1.5; wherein TL is the distance between a peak of the surface of the first lens that faces the objective side and an image-forming surface at the image side; wherein f is the value of the equivalent focal length of the image-forming lens set;

wherein said lens set satisfies the condition of BFL/f>0.5; wherein BFL is the value of back focal length of the image-forming lens set, and f is the value of the equivalent focal length of the image-forming lens set;

wherein said lens set satisfies the conditions of 1<|R4|/|R5|<5 and 0.1<|R6|/|R7|<10; wherein |R4| is the absolute value of the radius of curvature of the surface of the second lens that faces the objective side; wherein |R5| is the absolute value of the radius of curvature of the concave surface of the second lens that faces the image side; wherein |R6| is the absolute value of the radius of curvature of the surface of the third lens that faces the objective side; wherein |R7| is the absolute value of the radius of curvature of the convex surface of the third lens that faces the image side;

wherein said lens set satisfies the condition of: D3/f<0.5; wherein D3 is the distance between a peak of the convex surface of the first lens that faces the image side and a peak of the surface of the second lens that faces the objective side, and f is the value of the equivalent focal length of the image-forming lens set;

wherein said lens set satisfies the condition of 0.2<D4/D6<3; wherein D4 is the distance between a center of the surface of the second lens that faces the objective side and a center of the concave surface of the second lens that faces the image side; wherein D6 is the distance between a center of the surface of the third lens that faces the objective side and a center of the convex surface of the third lens that faces the image side;

wherein said lens set satisfies the condition of 1<|R1|/|R2|<5; wherein |R1| is the absolute value of the radius of curvature of the surface of the first lens that faces the objective side, and |R2| is the absolute value of the radius of curvature of the convex surface of the first lens that faces the image side;

wherein the second lens has a convex surface facing the objective side;

wherein the third lens has a convex surface facing the objective side; and wherein the third lens has a convex surface facing the objective side.

2. An image-forming lens set consisting only of a first lens, a second lens, an aperture and a third lens arranged in the order recited from an objective side toward an image side in sequence;

wherein the first lens is made of plastic material and has a positive diopter and two opposite surfaces including a convex surface facing the image side;

wherein the second lens is made of plastic material and has a negative diopter and two opposite surfaces including a concave surface facing the image side;

wherein the third plastic lens is made of plastic material and has a positive diopter and two opposite surfaces including a convex surface facing the image side;

wherein said lens set satisfies the condition of 0.2<D4/D6<3; wherein D4 is the distance between a center of the surface of the second lens that faces the objective side and a center of the concave surface of the second lens that faces the image side; wherein D6 is the distance between a center of the surface of the third lens that faces the objective side and a center of the convex surface of the third lens that faces the image side; and wherein said lens set satisfies the condition of 1<|R1|/|R2|<5; wherein |R1| is the absolute value of the radius of curvature of the surface of the first lens that faces the objective side, and |R2| is the absolute value of the radius of curvature of the convex surface of the first lens that faces the image side.

3. An image-forming lens set consisting only of a first lens, a second lens, an aperture and a third lens arranged in the order recited from an objective side toward an image side in sequence;

wherein the first lens is made of plastic material and has a positive diopter and two opposite surfaces including a convex surface facing the image side;

wherein the second lens is made of plastic material and has a negative diopter and two opposite surfaces including a concave surface facing the image side;

wherein the third plastic lens is made of plastic material and has a positive diopter and two opposite surfaces including a convex surface facing the image side; and wherein said lens set satisfies the condition of BFL/f>0.5; wherein BFL is the value of back focal length of the image-forming lens set, and f is the value of the equivalent focal length of the image-forming lens set.

* * * * *